(12) United States Patent
Eickmeyer et al.

(10) Patent No.: US 6,507,803 B1
(45) Date of Patent: Jan. 14, 2003

(54) METHOD FOR DETERMINING SPRAYING PARAMETERS FOR A PAINT SPRAYING UNIT

(75) Inventors: Dietmar Eickmeyer, Heidelberg (DE); Gunter Börner, Mühlhausen (DE)

(73) Assignee: ABB Research Ltd., Zurich ( * ) Notice: Subject to any disclaimer, the term of this patent is extended or adjusted under 35 U.S.C. 154(b) by 88 days.

(21) Appl. No.: 09/630,149

(22) Filed: Jul. 31, 2000

(30) Foreign Application Priority Data

Jul. 31, 1999 (DE) .......................................... 199 36 148

(51) Int. Cl.⁷ ............................ G01B 5/02; G01B 7/02; G01B 11/02
(52) U.S. Cl. ........................................ 702/170; 706/15
(58) Field of Search ................................ 702/170, 127; 706/15, 16, 25; 118/50.1, 300, 663–677, 712, 629; 361/227, 225; 427/7, 9, 10, 8, 446–456; 239/63, 708

(56) References Cited

U.S. PATENT DOCUMENTS

| | | | | |
|---|---|---|---|---|
| 5,086,972 A | * | 2/1992 | Chang et al. ................... | 239/3 |
| 5,311,421 A | * | 5/1994 | Nomura et al. ................ | 700/37 |
| 5,443,642 A | * | 8/1995 | Bienduga ..................... | 118/688 |
| 5,518,772 A | * | 5/1996 | Andachi et al. ............. | 427/434 |
| 5,674,752 A | * | 10/1997 | Buckley et al. ............. | 436/151 |
| 5,689,415 A | * | 11/1997 | Calotychos et al. .......... | 700/67 |
| 5,761,070 A | * | 6/1998 | Conners et al. ............. | 700/223 |
| 5,863,613 A | * | 1/1999 | Emch ........................ | 427/422 |
| 5,907,495 A | * | 5/1999 | Snyder et al. ................. | 703/6 |
| 6,126,808 A | * | 10/2000 | Rasmussen .................. | 205/324 |
| 6,164,561 A | * | 12/2000 | Yoshida et al. ............. | 239/223 |
| 6,278,906 B1 | * | 8/2001 | Piepmeier et al. .......... | 700/250 |
| 6,326,160 B1 | * | 12/2001 | Dunn et al. .................... | 435/14 |
| 6,421,612 B1 | * | 7/2002 | Agrafiotis et al. ............ | 702/19 |

OTHER PUBLICATIONS

Ramamurthy, A.C., Stone impact damage to automotive paint finishes–a neural net analysis of electrochemical impedance data, Mar. 28–Apr. 1, 1993, Neural Networks, 1993, IEEE International Conference, vol. 3, pp. 1708–1712.*

Borges, G.A., Characterization of a neural network–based trajectory recognition optical sensor for an automated guided vehicle, May 18–21, 1998, Instrumentation and Measurement Technology Conference, vol. 2, pp. 1179–1184.*

* cited by examiner

*Primary Examiner*—John S. Hilten
*Assistant Examiner*—Demetrius Pretlow
(74) *Attorney, Agent, or Firm*—Laurence A. Greenberg; Werner H. Stemer; Gregory L. Mayback

(57) ABSTRACT

A method for determining spraying parameters that are suitable as input values for a paint spraying unit that can electrostatically charge a liquid paint. In this case, at least one artificial neural network is used to determine the spraying parameters, an output of such a neural network being available for each spraying parameter. A suitable number of real measured values are fed to the one neural network or a plurality of neural networks as input values, initially in a learning phase. The measured values further contain associated real spraying parameters in addition to a paint thickness distribution in the form of discrete values. Input values are fed to the one neural network or a plurality of neural networks in the application phase. The input values being the result of an analysis of the paint thickness distribution of a targeted, that is to say prescribed, spraying result.

5 Claims, 3 Drawing Sheets

METHOD FOR DETERMINING SPRAYING PARAMETERS FOR A PAINT SPRAYING UNIT

BACKGROUND OF THE INVENTION

Field of the Invention

The invention relates to a method for determining spraying parameters that are suitable as input values for a paint spraying unit that can electrostatically charge a liquid paint.

If a specific painting result of an electrostatically based painting unit is prescribed, that is to say is targeted, the associated physical spraying parameters such as paint volume, directing-air rate, control-air rate or high voltage must be determined with the aid of a paint thickness distribution to be targeted. This is performed in practice essentially on the basis of empirical experience on the part of the user of painting units. Although the average paint thickness distribution can be determined with the aid of the average paint throughput per surface under consideration, there is, however, no method for determining the spraying parameters corresponding to an exact paint thickness distribution.

SUMMARY OF THE INVENTION

It is accordingly an object of the invention to provide a method for determining spraying parameters for a paint spraying unit that overcomes the disadvantages of the prior art methods of this general type.

With the foregoing and other objects in view there is provided, in accordance with the invention, a method for determining spraying parameters suitable as input values for a paint spraying unit that can electrostatically charge liquid paint. The method includes using at least one artificial neural network to determine the spraying parameters, and the artificial neural network has an output available for each of the spraying parameters. A suitable number of real measured values are fed to the at least one artificial neural network as input values, initially in a learning phase, the real measured values contain associated real spraying parameters in addition to a paint thickness distribution in a form of discrete values. The input values are fed to the at least one artificial neural network in an application phase, the input values being a result of an analysis of the paint thickness distribution of a prescribed spraying result.

It is the object of the invention to specify a method with the aid of which, in the case of the prescription of a specific painting result, that is to say a paint thickness distribution, the input values thereby required for the paint spraying unit, that is to say the physical spraying parameters, can be determined.

In this method, the spraying parameters to be set are determined from a desired spray pattern which is to be attained, with the aid of artificial neural networks which are trained with the aid of real measured data.

In accordance with an added feature of the invention, there is the step of determining the real measured values, to be input in the learning phase, at least partly by a mathematical model of the paint spraying unit.

In accordance with an additional feature of the invention, for each of the spraying parameters to be determined, there is the step of using one artificial neural network having an output value bearing a fixed relationship to the spraying parameter to be determined.

In accordance with another feature of the invention, the at least one neural network has a plurality of outputs which respectively correspond to one of the spraying parameters to be determined.

In accordance with a concomitant feature of the invention, there is the step of using a multilayer perceptron trained with an aid of a backpropagation method as the at least one artificial neural network.

Other features which are considered as characteristic for the invention are set forth in the appended claims.

Although the invention is illustrated and described herein as embodied in a method for determining spraying parameters for a paint spraying unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
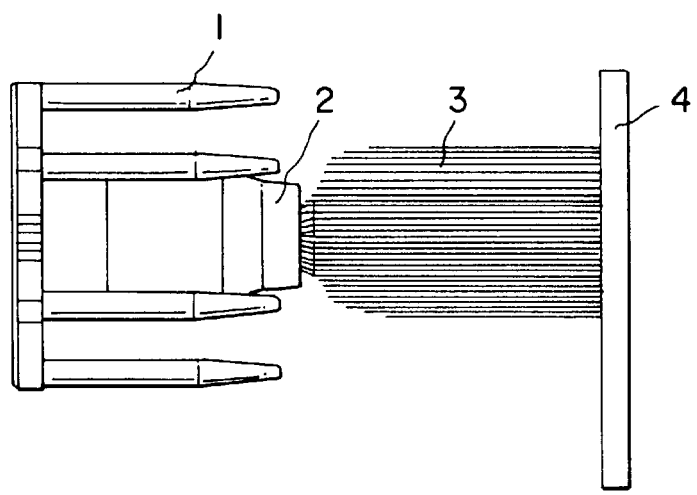
FIG. 1 is a diagrammatic, side elevational view of a paint spraying device and a spray cloud produced by it according to the invention.

In all the figures of the drawing, sub-features and integral parts that correspond to one another bear the same reference symbol in each case. Referring now to the figures of the drawing in detail and first, particularly, to FIG. 1 thereof, there is shown a diagrammatic illustration of a paint spraying device 2 which supplies a paint spraying jet 3 or a paint spray cloud 3. The paint being charged by electrodes 1. The paint is deposited onto an object 4.

Figure 2:
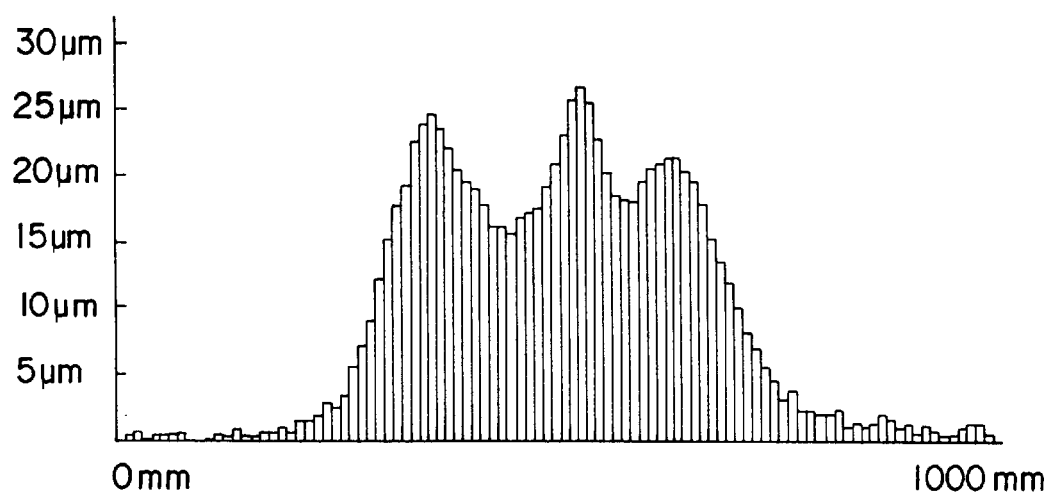
FIG. 2 is a graph of a real paint thickness distribution.

A paint layer can be produced on the object 4 by a horizontal or vertical movement of the spraying device 2 and a paint thickness distribution can be measured. FIG. 2 shows the result of such a paint layer analysis in 2-dimensional form, the paint layer thickness in micrometers being specified on the ordinate, and a measured value being specified on the abscissa. Such a curve of the paint thickness distribution is normally present in the form of approximately 200 discrete measured values.

Desired variables which are to be determined with the aid of the measured values are, numerically, approximately 10 spraying parameters. For example paint volume, directing-air quantity per time unit, control air quantity per time unit, high voltage, rate of movement of the applicator (spraying device), rotational speed of an atomizer (in the case of customary rotating atomizer bell of the spraying device), and angle of rotation of the configuration.

Figure 3:
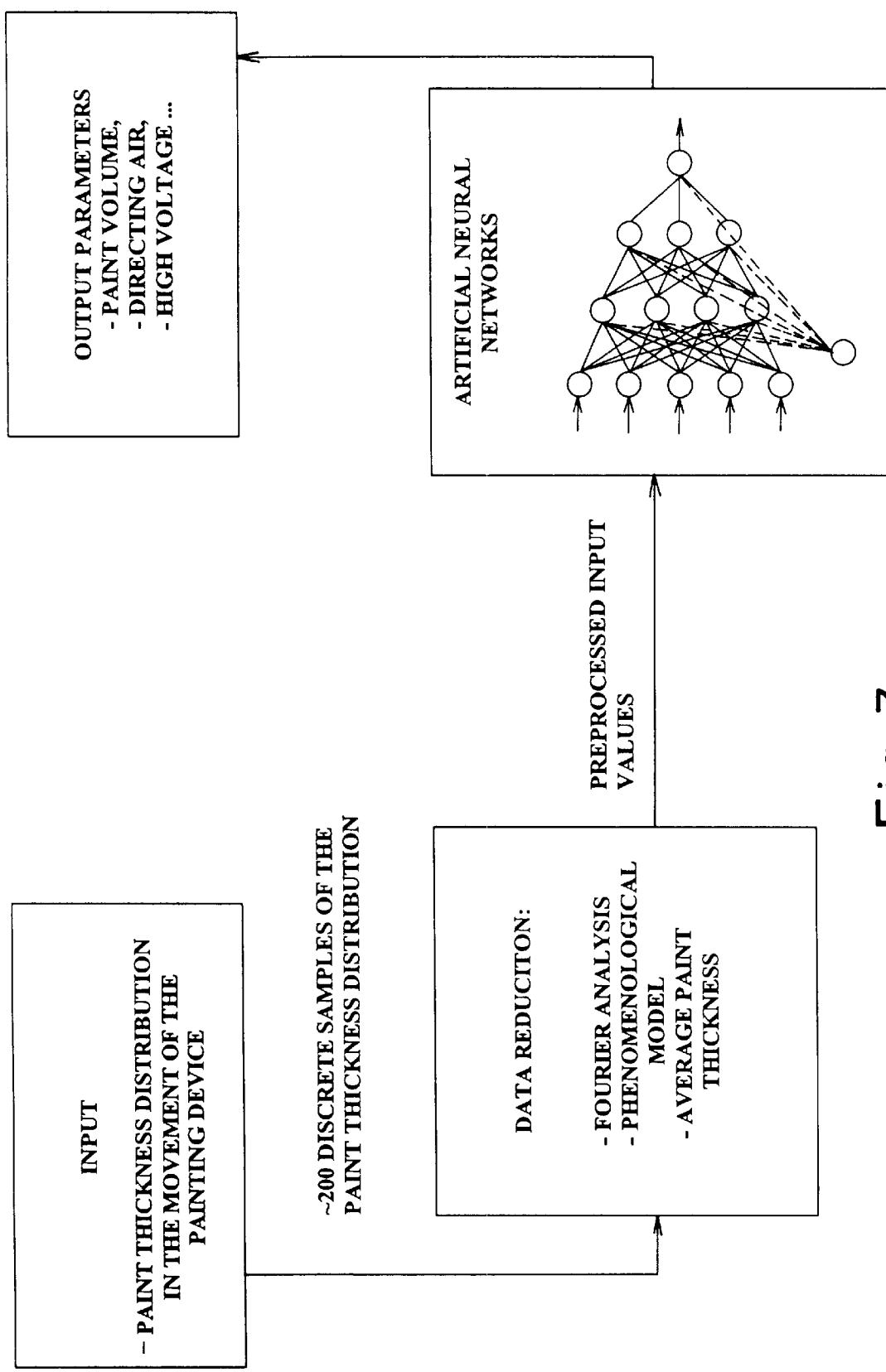
FIG. 3 is a flowchart outlining method steps of the invention.
Figure 4:
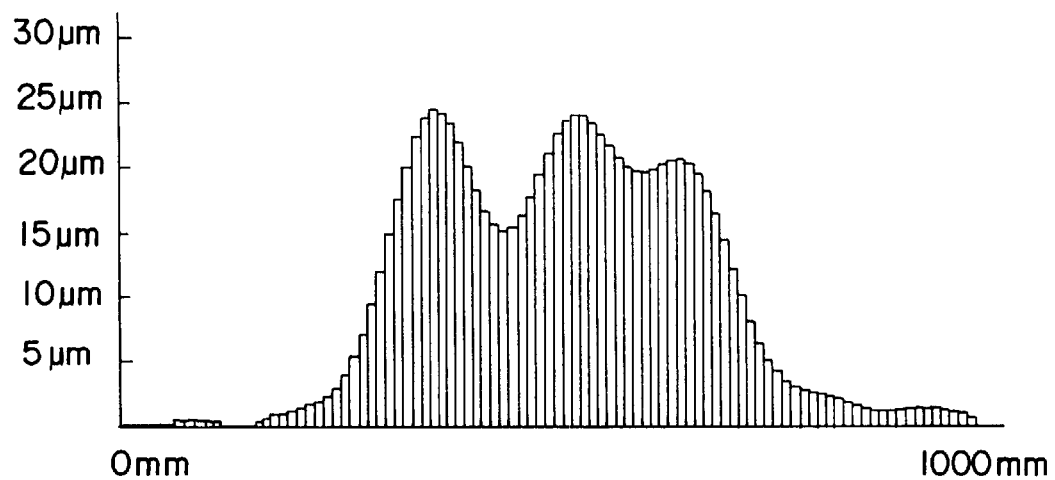
FIG. 4 is a graph of a virtual paint thickness distribution.

The basic method sequence is detailed in FIG. 3.

For each of the spraying parameters to be determined, it is necessary to train an artificial neural network having one output each, whose output value bears a fixed relationship to the spraying parameter to be determined. However, variants are also possible in which a network has a plurality of outputs that respectively correspond to one of the spraying parameters to be determined.

Input variables for the artificial neural networks are represented by the features that are determined from the approximately 200 measured values available. Such extraction of features is customary in the case of the use of artificial neural networks, and serves both to reduce data and to introduce knowledge already present such as, for example, the average paint thickness distribution mentioned at the beginning.

There are no specific rules as to which features are to be fed to the respective artificial neural network as input variables. The below listed features have proved to be sensible.

a) Fourier analysis of the paint thickness distribution (compare FIG. 2) are used in each case to determine the amplitude of the 2nd to 14th harmonic, as illustrated in FIG. 3, and the amplitude is used as an input parameter for the artificial neural network.

b) A mean value of the paint thickness distribution.

c) Parameters which correspond to the properties of the paint used (viscosity, productivity).

d) A parameter that specifies the nature of the paint, but contains no specific properties (the properties thereof are incorporated during the learning process into the "knowledge", of the artificial neural network). It is expedient to make use for each paint of a separate input that either has the value 0 or the value 1. Specifying the paint in the form of a single value between 1 and n (=number of paints) is not expedient, since the nature of the paint could be misinterpreted as a physical property during the learning process.

Figure 5:
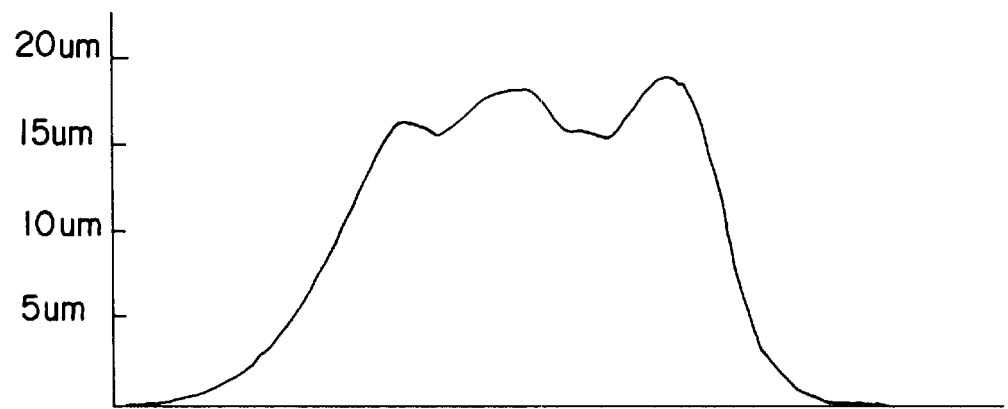
FIG. 5 is a graph of the virtual paint thickness distribution that has been determined by a model.

Other possibilities such as the iterative determination of as similar as possible a paint distribution that is produced by a suitable model, for example based on artificial neural networks, are possible. After determination of such a paint distribution, illustrated in FIG. 5, the parameters of the model which do not correspond to the real spraying parameters are known and can serve as input parameters for an artificial neural network for determining the real spraying parameters. An advantage of this procedure consists in that virtual paint thickness distributions that are physically excluded can be converted by such a model to form the most similar physically sensible variant. For example, the mean quadratic deviation of the discrete values of the paint thickness distribution can be determined.

A suitable type of neural network is the multilayer perceptron which has been trained with the aid of a backpropagation method. However, other types of networks with real input and output variables are also conceivable. The number of the input neurons of the respective networks corresponds to the number of the input parameters used (approximately 15), while the number of the output neurons corresponds to the number of the spraying parameters to be determined by this network, that is to say 1 or even more. The number of the hidden layers can be 1 or 2, depending on which variant of the learning process runs more successfully.

The learning process is performed using a suitable number of real measurements (typically >300), in which case all available measurements should always be used. In addition to the paint thickness distribution in the form of discrete values, each measurement must also include the associated real spraying parameters. The extraction of features from the discrete samples, which is practiced when applying the method, must be carried out in exactly the same way as in the case of the generation of the learning data record.

We claim:

1. A method for determining spraying parameters suitable as input values for a paint spraying unit that can electrostatically charge liquid paint, which comprises the steps of:

using at least one artificial neural network to determine the spraying parameters, and the artificial neural network having an output available for each of the spraying parameters;

feeding a number of real measured values to the at least one artificial neural network as input values, initially in a learning phase, the real measured values containing associated real spraying parameters in addition to a paint thickness distribution in a form of discrete values; and feeding the input values to the at least one artificial neural network in an application phase, the input values being a result of an analysis of the paint thickness distribution of a prescribed spraying result.

2. The method according to claim 1, which comprises determining the real measured values, to be input in the learning phase, at least partly by a mathematical model of the paint spraying unit.

3. The method according to claim 1, which comprises that for each of the spraying parameters to be determined, using one artificial neural network having an output value bearing a fixed relationship to the spraying parameter to be determined.

4. The method according to claim 1, wherein the at least one neural network has a plurality of outputs which respectively correspond to one of the spraying parameters to be determined.

5. The method according to claim 1, which comprises using a multilayer perceptron trained with an aid of a backpropagation method as the at least one artificial neural network.

* * * * *